(No Model.)
R. C. ANDERSEN.
COOKING VESSEL.
No. 474,622. Patented May 10, 1892.
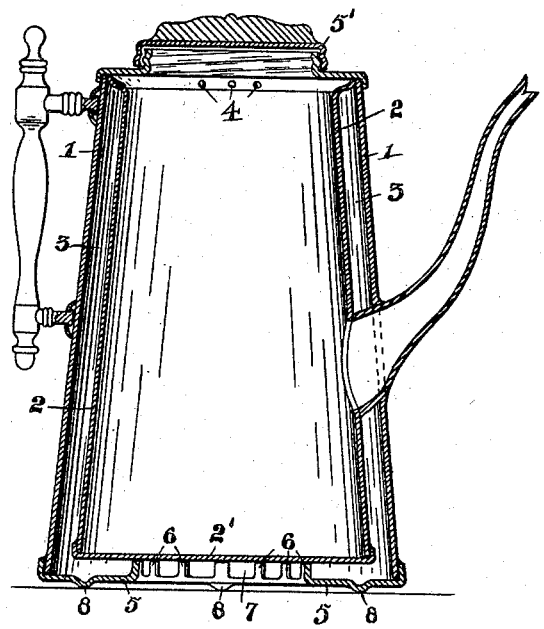
WITNESSES
Arch. M. Gatlin.
O. H. Klaus
INVENTOR
Richard C. Andersen
by
Benj. R. Catlin
Atty.

UNITED STATES PATENT OFFICE.

RICHARD C. ANDERSEN, OF PAWNEE CITY, NEBRASKA.

COOKING-VESSEL.

SPECIFICATION forming part of Letters Patent No. 474,622, dated May 10, 1892.

Application filed December 10, 1891. Serial No. 414,578. (No model.)

*To all whom it may concern:*

Be it known that I, RICHARD C. ANDERSEN, a resident of Pawnee City, in the county of Pawnee and State of Nebraska, have invented certain new and useful Improvements in Cooking-Vessels; and I do hereby declare the following to be a full, clear, and exact description of the invention, such as will enable others skilled in the art to which it pertains to make and use the same.

The invention relates to vessels for cooking food and for analogous purposes; and its object is to provide a simple device that will prevent the escape of steam and odors and which will at the same time prevent loss of heat and provide for the maintenance of steam-pressure in the vessel above the normal atmospheric pressure without entirely closing the same.

The invention consists in the construction hereinafter described, and particularly pointed out in the claims.

In the accompanying drawing the figure is a vertical central section of my improved cooking utensil.

The particular size, shape, and uses of the vessel are not material and the drawing may be considered diagrammatic to some extent.

Numeral 1 indicates the exterior and 2 the interior wall, separated from the exterior by a space 3, which preferably surrounds the vessel on all sides. The upper end of the wall 2 of the interior receptacle is flared outwardly and joined to the exterior wall, and a single cover is employed both for the interior and exterior receptacles.

4 are apertures whereby the space 3 and the interior of the vessel freely communicates.

5' denotes a cover, which should be made to fit closely. In the case of a coffee-pot or other vessel having a comparatively small mouth a screw-cap cover is suitable. The cover should be substantially steam-tight. The interior wall 2 is closed by a bottom 2', which does not extend as low as wall 1.

5 indicates an annular plate provided with upturned lips 6, which plate is secured to the outer wall 1 of the vessel, the upturned lips or flanges 6 being made to bear against the bottom 2' of the interior of the vessel at points midway between its periphery and center to support the same. The space 7, surrounded by the annular plate, and the bottom 2' are designed to receive the heat of a gas or oil flame or of a hot stove-plate. The vessel, however, may be used over any kind of a fire and on any stove. In the annular plate 5 feet 8 are formed, preferably by indenting the metal. These feet support the plate above the stove-top and have the effect to enlarge the superheating-space 7.

The operation of the improvement is as follows: Articles to be cooked having been placed in the vessel and the latter tightly covered and placed over a fire, steam is quickly generated from the water in the vessel, and rising to its upper part is forced into the space 3 and down toward the bottom of the vessel. The exterior wall 1, being exposed to atmospheric influences, is cooler than the interior of the vessel and also cooler than the steam which descends in contact therewith, and which is therefore condensed or partially condensed thereby. The steam thus partially cooled descends toward the bottom of the vessel and comes in direct contact with the flame of the burner or with the hot plate of the stove, and is at once converted into steam of higher pressures and ascends next to the interior wall 2.

I have found in practice that steam does not escape into the air in any appreciable amount. None is visible, and odors of food are not perceptible. I have also found that food is more thoroughly cooked in a given time than in ordinary vessels. This is attributable to different causes. The inner receptacle is surrounded by an air or steam space, which defends it against radiation or against the cooling effect of external air-currents. The downward escape of the steam is opposed by the heat of the flame or of the hot stove-plate tending to superheat or expand it in the space immediately below the inner vessel. This also tends to raise the pressure in the interior of the vessel a little above atmospheric pressure, so that its heat is thereby increased, and the loss of such heat is prevented by the outer vessel, as stated.

Practical experiment has demonstrated the utility of the device, and I do not rest my claim of invention solely upon the theory of operation herein set forth, though it is probably correct.

As my improved vessel gives off no odors when in use on a hot stove-plate or over a gas or other open burner having no chimney, it may be inferred, if the above theory of the operation does not fully account for the effect, that the essential oils or odors are burned in contact with the stove or flame.

I am aware that vessels with double walls inclosing a space which communicates with the top of the vessel and with the interior of the stove is not new; and I do not broadly claim such construction.

It is characteristic of my improvement that it provides a space 7 under the bottom 2' of the vessel and above the foot of its outer wall, whereby a superheating or expansion chamber is provided above and near the level of the bottom or annulus 5, said annulus being without a pot-hole extension and the sole bottom of the utensil and adapted to rest on the top of a stove, the central part of said bottom being cut away, whereby the center of the bottom of the inner receptacle is exposed to direct radiation either from the stove-top or from a stove-hole.

This construction, when used in a stove provided with pot-holes, exposes no joints or other parts to actual contact with flame, whereby violent ebullition would be caused, and whereby soldered joints may under some circumstances be impaired, and it permits the inner receptacle to be efficiently heated from the stove-top or from holes of various sizes without projecting any part of the vessel into the pot-hole below the plane of the stove-top, by which excessive ebullition is caused and aromas or odors expelled from the vessel, and it also simplifies the construction of double-walled vessels, said annulus extending under the bottom 2', and adapted to support the vessel and to be heated by a stove-plate or by a flame, as herein set forth.

Having thus described my invention, what I desire to secure by Letters Patent is—

1. The double-walled vessel provided with a tight cover and having its walls joined at their tops, the inner wall being perforated near its upper end and the outer wall having secured to its foot the annulus 5, extending under the bottom of the inner receptacle and provided with upward projections 6, bearing against the bottom of said inner receptacle at points approximately midway between the periphery and center of said bottom, substantially as set forth.

2. The cooking-vessel having an inner receptacle and provided with a steam-tight cover and with two walls 1 and 2, fixed together, the former extending below the latter and having for its bottom the horizontal plate 5, extending immediately under the said receptacle and provided with upturned lips 6, said plate being adapted to inclose a space above the foot of the outer wall and below the bottom of the inner receptacle in communication with that immediately below the said inner receptacle and also in free communication with the interior of the latter at its upper part, the central part of the bottom of said outer receptacle being cut away, all substantially as set forth.

3. The cooking-vessel provided with a steam-tight cover and with two walls 1 and 2, fixed together, the former extending below the latter and having for its bottom the plate 5, provided with the feet 8 and upturned lips 6 and adapted to support the utensil by resting on any part of a stove-top and to leave the center of the bottom of the inner receptacle exposed to direct radiation from said top, the space immediately under the plate 5 being in direct communication with the bottom of the inner receptacle and also in communication with the interior of said inner receptacle, substantially as set forth.

In testimony whereof I have signed this specification in the presence of two subscribing witnesses.

RICHARD C. ANDERSEN.

Witnesses:
D. D. DAVIS,
C. H. HUNGATE.